US011995863B2

United States Patent
Gu et al.

(10) Patent No.: US 11,995,863 B2
(45) Date of Patent: May 28, 2024

(54) METHOD FOR COUNTING REGIONAL POPULATION, COMPUTER DEVICE AND COMPUTER READABLE STORAGE MEDIUM

(71) Applicant: BOE TECHNOLOGY GROUP CO., LTD., Beijing (CN)

(72) Inventors: Yu Gu, Beijing (CN); Jinglin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 410 days.

(21) Appl. No.: 17/416,590

(22) PCT Filed: Sep. 29, 2020

(86) PCT No.: PCT/CN2020/118864
§ 371 (c)(1),
(2) Date: Jun. 21, 2021

(87) PCT Pub. No.: WO2022/067514
PCT Pub. Date: Apr. 7, 2022

(65) Prior Publication Data
US 2022/0335644 A1  Oct. 20, 2022

(51) Int. Cl.
*G06T 7/80* (2017.01)
*G06T 7/73* (2017.01)
*G06V 10/22* (2022.01)

(52) U.S. Cl.
CPC .............. *G06T 7/73* (2017.01); *G06T 7/80* (2017.01); *G06V 10/22* (2022.01); *G06T 2207/30196* (2013.01); *G06T 2207/30242* (2013.01)

(58) Field of Classification Search
CPC ... G06T 7/73; G06T 7/80; G06T 2207/30196; G06T 2207/30242; G06V 10/22; G06V 10/225; G06V 20/52; G06V 40/10
USPC .................................................. 382/103, 100
See application file for complete search history.

(56) References Cited

U.S. PATENT DOCUMENTS 7,227,893 B1    6/2007  Srinivasa et al.

FOREIGN PATENT DOCUMENTS

| CN | 101477641 A | 7/2009 |
| CN | 105486235 A | 4/2016 |
| CN | 111310994 A | 6/2020 |
| CN | 111652168 A | 9/2020 |

*Primary Examiner* — Sheela C Chawan
(74) *Attorney, Agent, or Firm* — HOUTTEMAN LAW LLC (57) ABSTRACT

Disclosed are a method for counting regional population, a computer device and a computer readable storage medium. The method for counting regional population includes: acquiring an image to be analyzed in a target region; detecting a position of each first human body part in the image to be analyzed; determining, according to the position of each first human body part in the image to be analyzed and a first transformation relation, a physical position of each first human body part in the target region; and determining the population in each sub-region according to a relative positional relation between the position of the first human body part in the image to be analyzed and the sub-image, as well as a relative positional relation between the physical position of the first human body part and the sub-region.

12 Claims, 4 Drawing Sheets

METHOD FOR COUNTING REGIONAL POPULATION, COMPUTER DEVICE AND COMPUTER READABLE STORAGE MEDIUM

CROSS-REFERENCE TO RELATED APPLICATIONS

This application is a National Phase Application filed under 35 U.S.C. 371 as a national stage of PCT/CN2020/118864, filed on Sep. 29, 2020, the contents of which are incorporated herein by reference in their entirety.

TECHNICAL FIELD

The present disclosure relates to the field of display technology, and particularly relates to a method for counting regional population, a computer device and a computer readable storage medium.

BACKGROUND

In the field of video monitoring, population counting often need to be performed in a monitored region. A relatively accurate population counting result is one of the important parameters for people safety, while providing valuable guide information for industries such as resource management, public transportation, advertisement putting and the like.

For population counting in an open region, the open region is generally divided into a plurality of sub-regions in each of which the population is counted respectively. A problem with current statistical methods is low accuracy.

SUMMARY

The embodiments of the disclosure provide a method for counting regional population, a computer device and a computer readable storage medium.

In a first aspect, the present disclosure provides a method for counting regional population, including:
acquiring an image to be analyzed in a target region, wherein the target region includes at least one sub-region, and the image to be analyzed includes at least one sub-image corresponding to the at least one sub-region one by one;
detecting a position of each first human body part in the image to be analyzed;
determining, according to the position of each first human body part in the image to be analyzed and a first transformation relation, a physical position of each first human body part in the target region, wherein the first transformation relation is a transformation relation between a physical position of the first human body part in the target region and a position thereof in the image to be analyzed; and
determining the population in each sub-region according to a relative positional relation between the position of the first human body part in the image to be analyzed and the sub-image, as well as a relative positional relation between the physical position of the first human body part and the sub-region.

In some embodiments, the first human body part includes a head; and the method for counting regional population further includes:
acquiring a calibration image of the target region;
determining the first transformation relation according to a physical position of a preset part of a mark object in the target region and an image position of the preset part of the mark object in the calibration image; and
acquiring a physical range of the sub-region.

In some embodiments, a height of the mark object is within a standard human height range, and the preset part of the mark object is a top of the mark object.

In some embodiments, the step of acquiring the physical range of the sub-region includes:
determining a second transformation relation according to a physical position of a bottom of the mark object and a position of the bottom of the mark object in the calibration image; wherein the second transformation relation is a transformation relation between the physical position of the bottom of the mark object and the position of the bottom of the mark object in the calibration image;
acquiring positions of a plurality of feature points defining the sub-region in the calibration image;
determining a physical position of each feature point according to a position of the feature point in the calibration image and the second transformation relation; and
determining the physical range of the sub-region according to the physical positions of the plurality of feature points.

In some embodiments, a plurality of mark objects are present in the target region, and the first transformation relation includes a first position transformation matrix that is determined according to the following 3:

$$\begin{bmatrix} X \\ Y \\ 1 \end{bmatrix} = H\_1 \begin{bmatrix} u \\ v \\ 1 \end{bmatrix} \quad (1)$$

where H_1 is the first position transformation matrix; X is a one-dimensional vector formed by abscissas of the tops of the plurality of the mark objects in a physical world coordinate system; Y is a one-dimensional vector formed by ordinates of the bottoms of the plurality of mark objects in the physical world coordinate system; u is a one-dimensional vector formed by abscissas of the tops of the plurality of mark objects in the calibration image; and v is a one-dimensional vector formed by ordinates of the tops of the plurality of mark objects in the calibration image.

In some embodiments, the second transformation relation includes a second position transformation matrix that is determined according to the following equation (2):

$$\begin{bmatrix} X \\ Y \\ 1 \end{bmatrix} = H\_2 \begin{bmatrix} uu \\ vv \\ 1 \end{bmatrix} \quad (2)$$

where H_2 is the second position transformation matrix; uu is a one-dimensional vector formed by the abscissas of the bottoms of the plurality of mark objects in the calibration image; and vv is a one-dimensional vector formed by ordinates of the bottoms of the plurality of mark objects in the calibration image.

In some embodiments, the step of determining the population in each sub-region according to the relative positional relation between the position of the first human body part in the image to be analyzed and the sub-image, as well as the relative positional relation between the physical position of the first human body part and the sub-region includes:
judging, for each sub-region, whether each first human body part is located in the sub-region using a two-level comparison method, and determining the population in the sub-region according to the judgment result;

wherein, the two-level comparison method includes: judging whether the position of the first human body part in the image to be analyzed is located in the range of the sub-image; judging, when the position of the first human body part in the image to be analyzed is located in the range of the sub-image, whether the physical position of the first human body part is located in the range of the sub-region; and determining that the first human body part is located in the sub-region when the physical position of the first human body part is located in the range of the sub-region.

In some embodiments, the step of judging whether the position of the first human body part in the image to be analyzed is located in the range of the sub-image includes:

judging whether a first reference line and a boundary of the sub-image have intersections; wherein the first reference line is a straight line passing through the position of the first human body part in the image to be analyzed; and determining that the position of the first human body part in the image to be analyzed is located in the range of the sub-image when the first reference line and the boundary of the sub-image have intersections, and an odd number of intersections are present on both sides of the position of the first human body part in the image to be analyzed; and judging whether the physical position of the first human body part is located in the sub-region, including:

judging whether a second reference line and a boundary of the sub-region have intersections; wherein the second reference line is a straight line passing through the physical position of the first human body part; and determining that the physical position of the first human body part is located in the sub-region when the second reference line and the boundary of the sub-region have intersections and an odd number of intersections are present on both sides of the physical position of the first human body part.

In some embodiments, the position of the first human body part in the image to be analyzed is detected by a target detection algorithm based on deep learning.

In a second aspect, an embodiment of the present disclosure further provides a computer device, including:

a processor; and a memory having a program stored thereon which, when executed by the processor, causes the following steps to be implemented:

acquiring an image to be analyzed in a target region, wherein the target region includes at least one sub-region, and the image to be analyzed includes at least one sub-image corresponding to the at least one sub-region one by one;

detecting a position of each first human body part in the image to be analyzed;

determining, according to the position of each first human body part in the image to be analyzed and a first transformation relation, a physical position of each first human body part in the target region, wherein the first transformation relation is a transformation relation between a physical position of the first human body part in the target region and a position thereof in the image to be analyzed; and determining the population in each sub-region according to a relative positional relation between the position of the first human body part in the image to be analyzed and the sub-image, as well as a relative positional relation between the physical position of the first human body part and the sub-region.

In some embodiments, the first human body part includes a head; and the program, when executed by the processor, further causes the following steps to be implemented:

acquiring a calibration image of the target region;

determining the first transformation relation according to a physical position of a preset part of a mark object in the target region and an image position of the preset part of the mark object in the calibration image; and acquiring a physical range of the sub-region.

In a third aspect, an embodiment of the present disclosure further provides a computer readable storage medium having a computer program stored thereon, wherein when executed by a processor, the program causes the method for counting regional population as described above to be implemented.

BRIEF DESCRIPTION OF THE DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure. In the drawings.

DETAILED DESCRIPTION OF THE EMBODIMENTS

Hereinafter, specific embodiments of the present disclosure will be described with respect to the accompanying drawings. It should be understood that the specific embodiments as set forth herein are merely for the purpose of illustration and explanation of the disclosure and should not be constructed as a limitation thereof.

When the distributed population in each of a plurality of sub-regions of an open region is counted in the related art, an image of the open region is captured first to detect a position of a human body in the image, then the position of the human body in the image is compared with a position of the sub-region in the image to determine in which sub-region the human body is located, and then the population in each sub-region is counted. However, in the captured image, a human body often has a head and feet in different positions of the image, and therefore, the image may include a state where: one part of the human body has entered a certain sub-region, while the other part of the human body is outside that sub-region. As a result, when determining the sub-region in which the human body is located, it is easy to make an error in judgement and thus lead to an inaccurate counting result.

Figure 1:
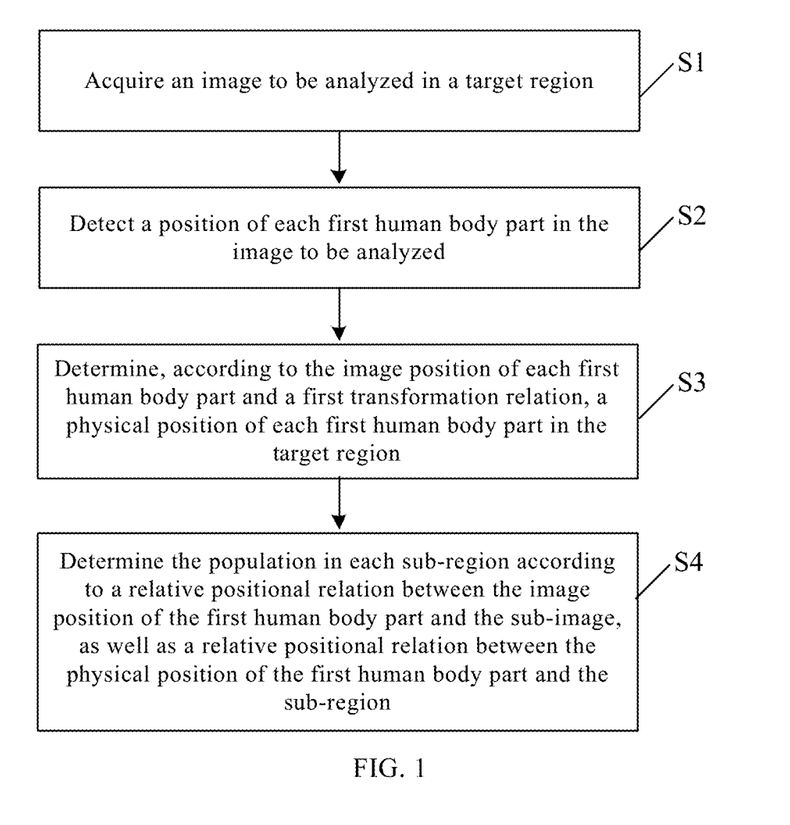
FIG. 1 is a flowchart of a method for counting regional population according to an embodiment of the present disclosure.

FIG. 1 is a flowchart of a method for counting regional population according to an embodiment of the present disclosure. As shown in FIG. 1, the method for counting regional population includes the following steps S1 to S4.

At step S1, an image to be analyzed in a target region is acquired, wherein the target region includes at least one sub-region, and the image to be analyzed includes at least one sub-image corresponding to the at least one sub-region one by one. The image to be analyzed may be an image of the target region captured by an image capturing device such as a camera, and the sub-image is an image of a sub-region captured by the image capturing device. In addition, the image capturing device may acquire an image of the target region captured in real time, and in step S1, each frame of the image captured by the image capturing device may be acquired, or the image captured by the image capturing device may be acquired at a predetermined frequency.

For example, a plurality of sub-images and a plurality of sub-regions are provided.

At step S2, an image position of each first human body part in the image to be analyzed is detected.

The first human body part is a part that can characterize a position of a human body. For example, the first human body part may be a head, or a shoulder.

At step S3, according to the image position of each first human body part and a first transformation relation, a physical position of each first human body part in the target region is determined.

The term "physical position" in the embodiment of the present disclosure refers to a corresponding position in the physical world. The first transformation relation is a transformation relation between a physical position of the first human body part in the three-dimensional physical world and an image position thereof in the image to be analyzed. For example, the first transformation relation is a mapping relationship table. For another example, the first transformation relation is a perspective projection matrix. The first transformation relation may be obtained in advance before step S1.

At step S4, the population in each sub-region is determined according to a relative positional relation between the image position of the first human body part and the sub-image, as well as a relative positional relation between the physical position of the first human body part and the sub-region.

In the embodiments of the present disclosure, the relative positional relation between the image position of the first human body part and the sub-image means whether the image position of the first human body part is located in or outside a range of the sub-image; and the relative positional relation between the physical position of the first human body part and the sub-region means whether the physical position of the first human body part is located in or outside a range of the sub-region.

In step S4, when determining the population in a certain sub-region, it is first determined whether each first human body part is located in the sub-region, and then the population in the sub-region. When the following two conditions are both satisfied, it is determined that the first human body part is located in the range of the sub-region; and when at least one of the following two conditions is not satisfied, it is determined that the first human body part is located outside the range of the sub-region.

Condition I: the image position of the first human body part is located in the range of the sub-image; and Condition II: the physical position of the first human body part is located in the range of the sub-region.

Therefore, when it is determined that Condition I is not satisfied, there may be no need to judge whether Condition II is satisfied; or, when it is determined that Condition II is not satisfied, there may be no need to judge whether Condition I is satisfied.

After step S4, the population in each sub-region may be transmitted to an output device for output. The output device is, for example, a display that displays the population in each physical region by way of display.

In the embodiments of the present disclosure, when counting the population in each sub-region, the population in the sub-region is determined in combination with the positional relation between the image position of the first human body part and the sub-image, as well as the positional relation between the first human body part and the sub-region. The statistical method provided in the embodiments of the present disclosure has improved statistical accuracy compared to either the method determines whether a human body is in a sub-region merely through the position between the image position of the first human body part and the sub-image, or the method determines whether a human body is in a sub-region merely through the position between the physical position of the first human body part and the sub-region.

In some embodiments, the first human body part includes a head. By determining the population based on detection the position and the physical position of the head of the human body in the image to be analyzed, the accuracy of population counting is improved, and when the first human body part includes a head, the position of the head of the human body in the image to be analyzed can be detected using a target detection algorithm, thereby increasing the detection speed.

Figure 2:
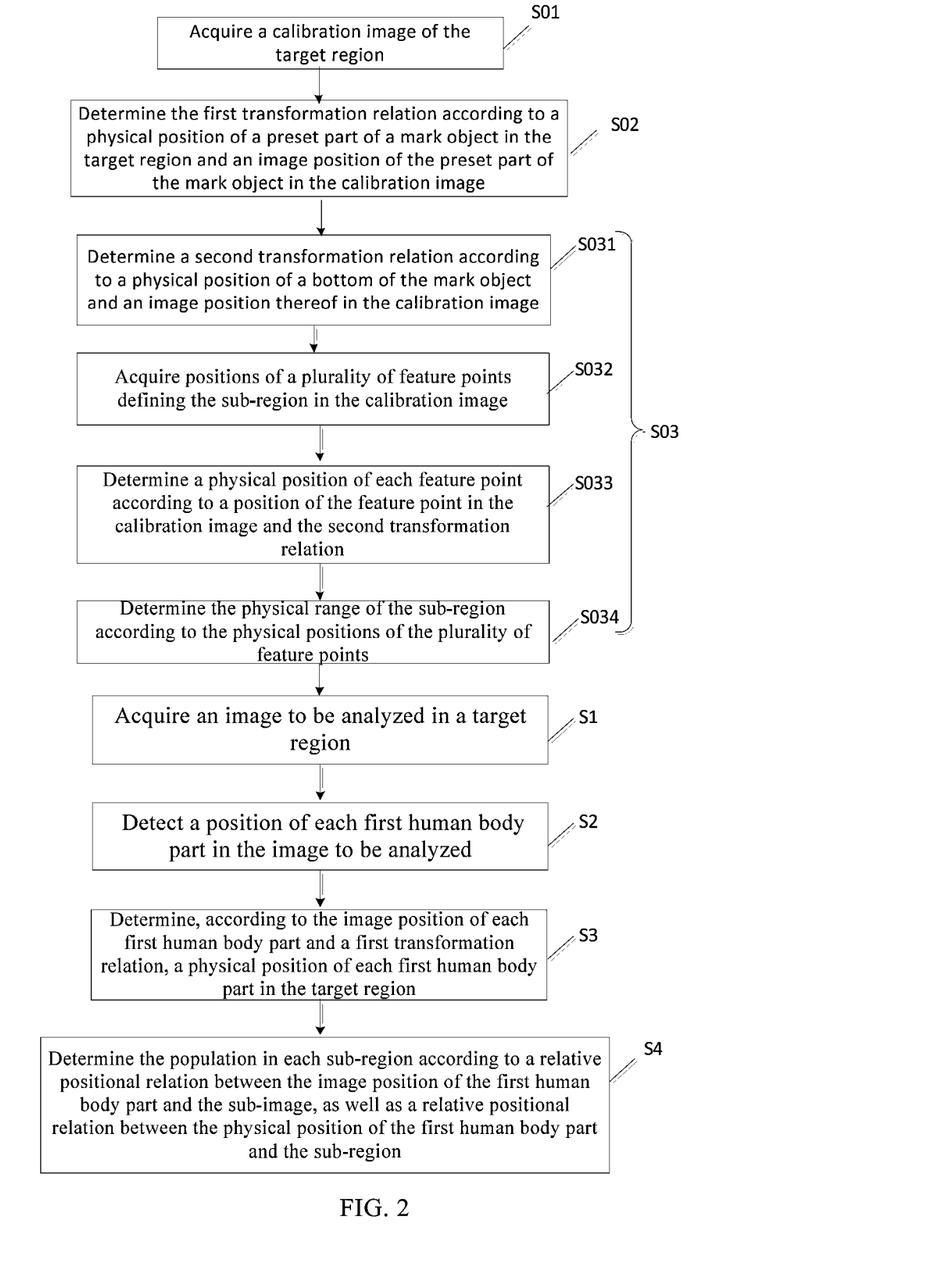
FIG. 2 is a flowchart of another method for counting regional population according to an embodiment of the present disclosure.

FIG. 2 is a flowchart of another method for counting regional population according to an embodiment of the present disclosure. As shown in FIG. 2, the method for counting regional population includes the following steps.

At step S01, a calibration image of the target region is acquired. The calibration image may be an image of a target region captured by an image capturing device.

At step S02, the first transformation relation is determined according to a physical position of a preset part of a mark object in the target region and an image position of the preset part of the mark object in the calibration image. For example, the image position of the preset part of the mark object in the calibration image may be acquired using a target detection method; obviously, other methods may be adopted.

Optionally, a plurality of mark objects are provided, which may be objects at mark points of the target region, such as a human body model, an upright pole, or a real person. A height of the mark object is within a standard human height range, and the preset part of the mark object is a top of the mark object. It should be noted that the standard human height range is a height range of a conventional adult, e.g., 1.5 m to 2 m. In addition, it should be noted that: the mark object is disposed on the ground of the target region, the top of the mark object is an end thereof away from the ground, and the bottom of the mark object is an end thereof closer to the ground.

In some embodiments, the first transformation relation includes a first position transformation matrix $H\_1$ that is determined according to the following equation (1):

$$\begin{bmatrix} X \\ Y \\ 1 \end{bmatrix} = H\_1 \begin{bmatrix} u \\ v \\ 1 \end{bmatrix} \quad (1)$$

where X is a one-dimensional vector formed by abscissas of the tops of the plurality of the mark objects in a physical world coordinate system; Y is a one-dimensional vector formed by ordinates of the bottoms of the plurality of mark objects in the physical world coordinate system; u is a one-dimensional vector formed by abscissas of the tops of the plurality of mark objects in the calibration image; and v is a one-dimensional vector formed by ordinates of the tops of the plurality of mark objects in the calibration image. It should be noted that the physical world coordinate system is a two-dimensional plane coordinate system located on a horizontal plane, and therefore the top and the bottom of the mark object have the same coordinates in the physical world coordinate system, while the top and the bottom of the mark object may not have the same coordinates in the calibration image since the image capturing device does not necessarily capture an image from directly above the mark object. In addition, an image coordinate system may be established on the calibration image; and the coordinates of the top (bottom) of the mark object in the calibration image are the coordinates of the top (bottom) of the mark object in the image coordinate system.

Exemplarily, there are four mark objects, the coordinates of the tops of the four mark objects in the physical world coordinate system are respectively (X1, Y1), (X2, Y2), (X3, Y3) and (X4, Y4), and the bottom and the top of each mark object have the same coordinates in the physical world coordinate system. The coordinates of the tops of the four mark objects in the calibration image are respectively: (u1, v1), (u2, v2), (u3, v3) and (u4, v4). Then, the above equation (1) is:

$$\begin{bmatrix} X1 & X2 & X3 & X4 \\ Y1 & Y2 & Y3 & Y4 \\ 1 & 1 & 1 & 1 \end{bmatrix} = H\_1 \begin{bmatrix} u1 & u2 & u3 & u4 \\ v1 & v2 & v3 & v4 \\ 1 & 1 & 1 & 1 \end{bmatrix}$$

At step S03, a physical range of the sub-region, that is, a range surrounded by the boundary of the sub-region in the target region, is acquired.

For example, by acquiring the physical positions of a plurality of feature points at the boundary of the sub-region, the physical position of the boundary of the sub-region is determined according to the physical positions of the plurality of feature points. The plurality of feature points are used to define a sub-region. For example, the sub-region is a polygonal region, and the plurality of feature points are a plurality of corner points of the sub-region. The positions of the feature points may be acquired by performing field measurement in the physical world, or may be calculated from the image positions and positional change relationships of the feature points in the calibration image. In practical applications, there are a large number of sub-regions and a large number of feature points per sub-region, and in this case, it is not convenient to conduct field measurement. Thus, in some embodiments, the physical positions of the feature points, and thus the physical ranges of the sub-regions, can be obtained by calculation. Specifically, step S03 includes the following steps S031 to S034.

At step S031, a second transformation relation is determined according to a physical position of a bottom of the mark object and an image position thereof in the calibration image. The second transformation relation is a transformation relation between the physical position of the bottom of the mark object and the position of the bottom of the mark object in the calibration image.

Optionally, the second transformation relation includes a second position transformation matrix H_2 that is determined according to the following equation (2):

$$\begin{bmatrix} X \\ Y \\ 1 \end{bmatrix} = H\_2 \begin{bmatrix} uu \\ vv \\ 1 \end{bmatrix} \quad (2)$$

where uu is a one-dimensional vector formed by the abscissas of the bottoms of the plurality of mark objects in the calibration image; and vv is a one-dimensional vector formed by ordinates of the bottoms of the plurality of mark objects in the calibration image.

Exemplarily, there are four mark objects, and the coordinates of the bottoms of the four mark objects in the physical world coordinate system are respectively (X1, Y1), (X2, Y2), (X3, Y3) and (X4, Y4). The coordinates of the tops of the four mark objects in the calibration image are respectively: (uu1, vv1), (uu2, vv2), (uu3, vv3) and (uu4, vv4). Then, the above equation (2) is:

$$\begin{bmatrix} X1 & X2 & X3 & X4 \\ Y1 & Y2 & Y3 & Y4 \\ 1 & 1 & 1 & 1 \end{bmatrix} = H\_1 \begin{bmatrix} uu1 & uu2 & uu3 & uu4 \\ vv1 & vv2 & vv3 & vv4 \\ 1 & 1 & 1 & 1 \end{bmatrix}$$

At step S032, image positions of the plurality of feature points defining the sub-region in the calibration image are acquired. For example, the sub-region is a polygonal region, and the feature points are corner points of the polygon.

At step S033, a physical position of each of the plurality of feature points is determined according to an image position of the feature point in the calibration image and the second transformation relation.

At step S034, the physical range of the sub-region is determined according to the physical positions of the plurality of feature points.

After step S03, the method for counting regional population further includes the following steps S1 to S4.

At step S1, an image to be analyzed in a target region is acquired. The image to be analyzed may be captured by an image capturing device, and the image to be analyzed and the calibration image are captured by the same image capturing device, wherein the image capturing device is installed at the same position and same angle. It should be noted that in practical applications, steps S01 to S03 may be executed once after the image capturing device is installed for the first time, and then steps S1 to S4 may be performed to count the population. Subsequently, under the condition that the image capturing device is fixed, steps S01-S03 may be not executed any more.

At step S2, an image position of each first human body part in the image to be analyzed is detected.

Optionally, the first human body part includes a head. The image position of the head in the image to be analyzed may be detected using a target detection algorithm based on deep learning, thereby increasing the detection speed and accuracy. For example, the target detection algorithm may be SSD (Single Shot MultiBox Detector), YOLO (You Only Look Once), and the like. The image position of the first human body part may be coordinates of a top of a head detection frame in the image to be analyzed.

At step S3, according to the image position of each first human body part and a first transformation relation, a physical position of each first human body part in the target region is determined. The physical position of the first human body part in the target region includes coordinates of the first human body part in the target region, which are expressed in two-dimensional coordinates.

For example, the first transformation relation includes the above first position transformation matrix H_1, wherein when the image position (i.e., coordinates) of a first human body part is (ui, vi), the physical position (i.e. coordinates) of that first human body part is (Xi, Yi), wherein Xi and Yi are obtained according to the following equation (3):

$$\begin{bmatrix} Xi \\ Yi \\ 1 \end{bmatrix} = H\_1 \begin{bmatrix} ui \\ vi \\ 1 \end{bmatrix} \quad (3)$$

At step S4, the population in each sub-region is determined according to a relative positional relation between the image position of the first human body part and the sub-image, as well as a relative positional relation between the physical position of the first human body part and the sub-region.

In some embodiments, step S4 includes:

judging, for each sub-region, whether each first human body part is located in the sub-region in the physical world, and determining the population in the sub-region according to the judgment result. When judging whether any human body key part is located in the sub-region, a two-level comparison method may be adopted.

Figure 3:
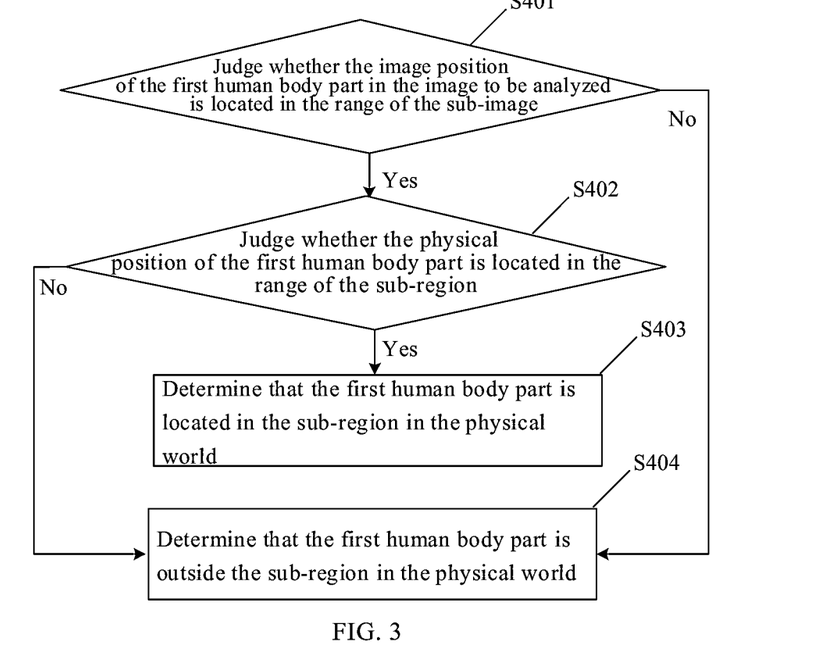
FIG. 3 is a flowchart of a two-level comparison method according to an embodiment of the present disclosure.

FIG. 3 is a flowchart of a two-level comparison method according to an embodiment of the present disclosure. As shown in FIG. 3, the two-level comparison method may include the following steps.

At step S401, it is judged whether the image position of the first human body part in the image to be analyzed is located in the range of the sub-image, if so, proceed to step S402; and if not, it is determined that the first human body part is located outside the sub-region in the physical world (step S404).

Figure 4A:
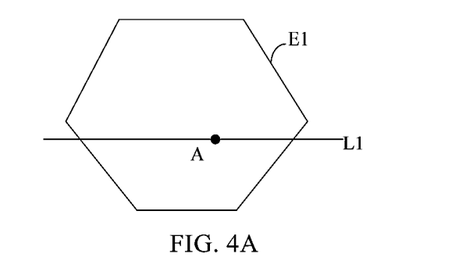
FIG. 4A is a schematic diagram showing an image position of a first human body part in an image to be analyzed located within a range of a sub-image according to an embodiment of the present disclosure.
Figure 4B:
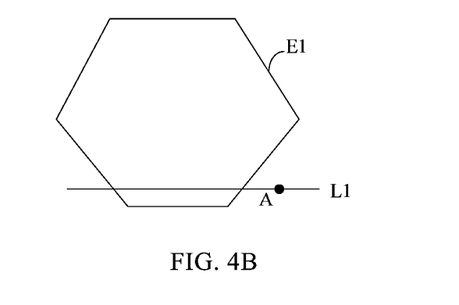
FIG. 4B is a schematic diagram showing an image position of a first human body part in an image to be analyzed located beyond a range of a sub-image according to an embodiment of the present disclosure.

FIG. 4A is a schematic diagram showing an image position of a first human body part in an image to be analyzed located within a range of a sub-image according to an embodiment of the present disclosure. FIG. 4B is a schematic diagram showing an image position of a first human body part in an image to be analyzed located beyond a range of a sub-image according to an embodiment of the present disclosure. As shown in FIG. 4, the image position of the first human body part in the image to be analyzed is position A. The process of judging whether the image position of the first human body part in the image to be analyzed is located in the range of the sub-image may specifically include:

judging whether a first reference line L1 passing through position A and a boundary E1 of the sub-image have intersections. As shown in FIG. 4A, when the first reference line L1 and the boundary E1 of the sub-image have intersections and an odd number of intersections are present on both sides of position A, it is determined that the image position of the first human body part is located in the range of the sub-image. As shown in FIG. 4B, when the first reference line L1 and the boundary E1 of the sub-image have intersections and the intersections are located at the same side of position A, it is determined that position A is located outside the range of the sub-image. When the first reference line L1 and the boundary E1 of the sub-image have no intersection, it is also determined that position A is located outside the range of the sub-image.

Exemplarily, the first reference line L1 is a straight line extending transversely on the image to be analyzed, that is, points on the first reference line L1 have the same ordinate. Alternatively, the first reference line L1 is a straight line extending longitudinally, that is, points on the first reference line L1 have the same abscissa.

At step S402, it is judged whether the physical position of the first human body part is located in the range of the sub-region, if so, it is determined that the first human body part is located in the sub-region in the physical world (step S403); and if not, it is determined that the first human body part is located outside the sub-region in the physical world (step S404). At this time, no other judgment is performed, so as to reduce the calculation amount and increase the processing speed.

The process of judging whether the physical position of the first human body part is located in the range of the sub-region is similar to the judging process in step S401, and may specifically include: judging whether a second reference line and a boundary of the sub-region have intersections; wherein the second reference line is a straight line passing through the physical position of the first human body part; and when the second reference line and the boundary of the sub-region have intersections and an odd number of intersections are present on both sides of the physical position of the first human body part, it is determined that the physical position of the first human body part is located in the range of the sub-region.

It should be noted that steps S01 to S03 may be performed before or after step S1.

Figure 5:
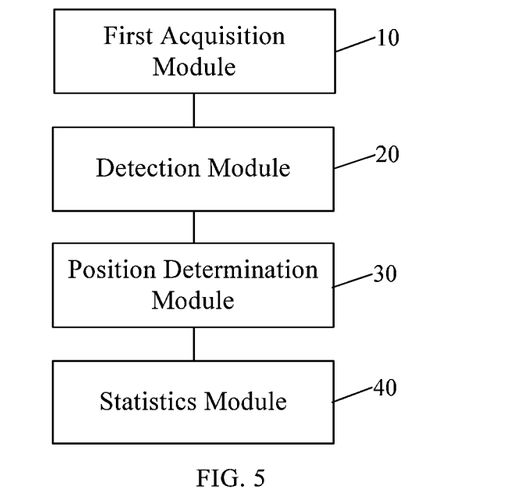
FIG. 5 is a schematic diagram of a device for counting regional population according to an embodiment of the present disclosure.

FIG. 5 is a schematic diagram of a device for counting regional population according to an embodiment of the present disclosure. As shown in FIG. 5, the device for counting regional population includes: a first acquisition module 10, a detection module 20, a position determination module 30 and a statistics module 40.

The first acquisition module 10 is configured to acquire an image to be analyzed in a target region, wherein the target region includes at least one sub-region, and the image to be analyzed includes at least one sub-image corresponding to the at least one sub-region one by one.

The detection module 20 is configured to detect a position of each first human body part in the image to be analyzed.

The position determination module 30 is configured to determine, according to the position of each first human body part in the image to be analyzed and a first transformation relation, a physical position of each first human body part in the target region, wherein the first transformation relation is a transformation relation between a physical position of an object and a position thereof in the image to be analyzed.

The statistics module 40 is configured to determine the population in each sub-region according to a relative positional relation between the position of the first human body part in the image to be analyzed and the sub-image, as well as a relative positional relation between the physical position of the first human body part and the sub-region.

Figure 6:
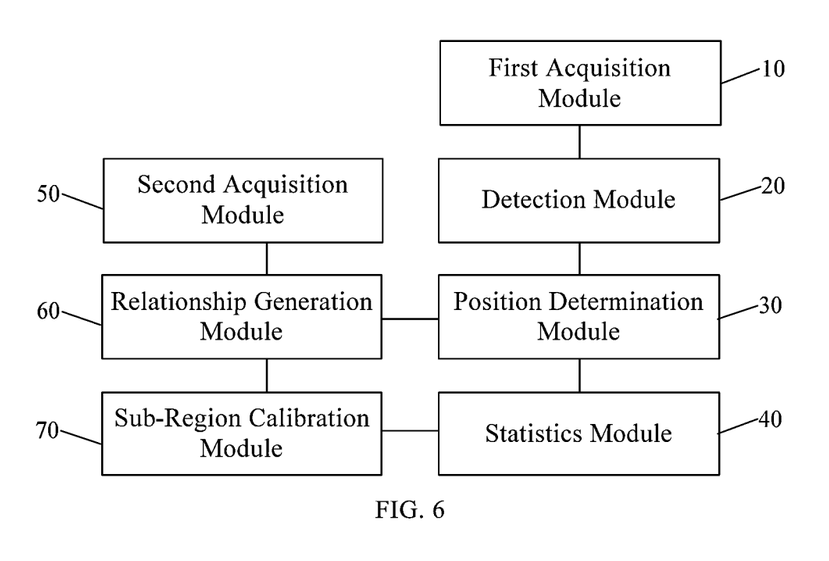
FIG. 6 is a schematic diagram of another device for counting regional population according to an embodiment of the present disclosure.

FIG. 6 is a schematic diagram of another device for counting regional population according to an embodiment of the present disclosure. As shown in FIG. 6, in some embodiments, the device for counting regional population further includes: a second acquisition module 50, a relationship generation module 60, and a sub-region calibration module 70. The second acquisition module 50 is configured to acquire a calibration image of the target region. The relationship generation module 60 is configured to determine the first transformation relation according to a physical position of a top of a mark object in the target region. The sub-region calibration module 70 is configured to acquire a physical range of the sub-region.

Functions of the modules are described in the above method for counting regional population, and thus are not repeated here.

In an embodiment of the present disclosure, there is further provided a computer device, including a processor and a memory. The memory has a program stored thereon which, when executed by the processor, causes the method for counting regional population in any of the above embodiment to be implemented.

In an embodiment of the present disclosure, there is further provided a computer readable storage medium having a computer program stored thereon, wherein when executed by a processor, the program causes the method for counting regional population in any of the above embodiment to be implemented.

The above described memory and computer readable storage medium include, but are not limited to: a random access memory (RAM), a read-only memory (ROM), a non-volatile random access memory (NVRAM), a programmable read-only memory (PROM), an erasable programmable read-only memory (EPROM), an electrically erasable programmable read only memory (EEPROM), a flash memory, a magnetic or optical data memory, a register, a magnetic disc or tape, an optical storage medium such as a compact disc (CD) or a DVD (digital versatile disc), and other non-transitory media. Examples of the processor include, but are not limited to, general purpose processors, central processing units (CPUs), microprocessors, digital signal processors (DSPs), controllers, microcontrollers, state machines, and the like.

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of these modifications and improvements also fall into the protection scope of the disclosure.

What is claimed is:

1. A method for counting regional population, comprising:
acquiring an image to be analyzed in a target region, wherein the target region comprises at least one sub-region, and the image to be analyzed comprises at least one sub-image corresponding to the at least one sub-region one by one;
detecting a position of each first human body part in the image to be analyzed;
determining, according to the position of each first human body part in the image to be analyzed and a first transformation relation, a physical position of each first human body part in the target region, wherein the first transformation relation is a transformation relation between a physical position of the first human body part in the target region and a position thereof in the image to be analyzed; and
determining the population in each sub-region according to a relative positional relation between the position of the first human body part in the image to be analyzed and the sub-image, as well as a relative positional relation between the physical position of the first human body part and the sub-region.

2. The method for counting regional population according to claim 1, wherein the first human body part comprises a head; the method for counting regional population further comprises:
acquiring a calibration image of the target region;
determining the first transformation relation according to a physical position of a preset part of a mark object in the target region and an image position of the preset part of the mark object in the calibration image; and
acquiring a physical range of the sub-region.

3. The method for counting regional population according to claim 2, wherein a height of the mark object is within a standard human height range, and the preset part of the mark object is a top of the mark object.

4. The method for counting regional population according to claim 3, wherein the step of acquiring the physical range of the sub-region comprises:
determining a second transformation relation according to a physical position of a bottom of the mark object and a position of the bottom of the mark object in the calibration image; wherein the second transformation relation is a transformation relation between the physical position of the bottom of the mark object and the position of the bottom of the mark object in the calibration image;
acquiring positions of a plurality of feature points defining the sub-region in the calibration image;
determining a physical position of each feature point according to a position of the feature point in the calibration image and the second transformation relation; and
determining the physical range of the sub-region according to the physical positions of the plurality of feature points.

5. The method for counting regional population according to claim 3, wherein a plurality of mark objects are present in the target region, and the first transformation relation comprises a first position transformation matrix that is determined according to the following equation (1):

$$\begin{bmatrix} X \\ Y \\ 1 \end{bmatrix} = H\_1 \begin{bmatrix} u \\ v \\ 1 \end{bmatrix} \quad (1)$$

where H_1 is the first position transformation matrix; X is a one-dimensional vector formed by abscissas of the tops of the plurality of the mark objects in a physical world coordinate system; Y is a one-dimensional vector formed by ordinates of the bottoms of the plurality of mark objects in the physical world coordinate system; u is a one-dimensional vector formed by abscissas of the tops of the plurality of mark objects in the calibration image; and v is a one-dimensional vector formed by ordinates of the tops of the plurality of mark objects in the calibration image.

6. The method for counting regional population according to claim 5, wherein the second transformation relation comprises a second position transformation matrix that is determined according to the following equation (2):

$$\begin{bmatrix} X \\ Y \\ 1 \end{bmatrix} = H\_2 \begin{bmatrix} uu \\ vv \\ 1 \end{bmatrix} \quad (2)$$

where H_2 is the second position transformation matrix; uu is a one-dimensional vector formed by the abscissas of the bottoms of the plurality of mark objects in the calibration image; and vv is a one-dimensional vector formed by ordinates of the bottoms of the plurality of mark objects in the calibration image.

7. The method for counting regional population according to claim 1, wherein the step of determining the population in each sub-region according to the relative positional relation between the position of the first human body part in the image to be analyzed and the sub-image, as well as the relative positional relation between the physical position of the first human body part and the sub-region comprises:

judging, for each sub-region, whether each first human body part is located in the sub-region using a two-level comparison method, and determining the population in the sub-region according to the judgment result;

wherein , the two-level comparison method comprises:
judging whether the position of the first human body part in the image to be analyzed is located in the range of the sub-image; judging, when the position of the first human body part in the image to be analyzed is located in the range of the sub-image, whether the physical position of the first human body part is located in the range of the sub-region; and determining that the first human body part is located in the sub-region when the physical position of the first human body part is located in the range of the sub-region.

8. The method for counting regional population according to claim 7, wherein the step of judging whether the position of the first human body part in the image to be analyzed is located in the range of the sub-image comprises:

judging whether a first reference line and a boundary of the sub-image have intersections; wherein the first reference line is a straight line passing through the position of the first human body part in the image to be analyzed; and determining that the position of the first human body part in the image to be analyzed is located in the range of the sub-image when the first reference line and the boundary of the sub-image have intersections, and an odd number of intersections are present on both sides of the position of the first human body part in the image to be analyzed; and judging whether the physical position of the first human body part is located in the sub-region, comprising:

judging whether a second reference line and a boundary of the sub-region have intersections; wherein the second reference line is a straight line passing through the physical position of the first human body part; and determining that the physical position of the first human body part is located in the sub-region when the second reference line and the boundary of the sub-region have intersections and an odd number of intersections are present on both sides of the physical position of the first human body part.

9. The method for counting regional population according to claim 1, wherein the position of the first human body part in the image to be analyzed is detected by a target detection algorithm based on deep learning.

10. A computer readable storage medium having a computer program stored thereon, wherein when executed by a processor, the program causes the method for counting regional population according to claim 1 to be implemented.

11. A computer device, comprising:
a processor; and
a memory having a program stored thereon which, when executed by the processor, causes the following steps to be implemented:

acquiring an image to be analyzed in a target region, wherein the target region comprises at least one sub-region, and the image to be analyzed comprises at least one sub-image corresponding to the at least one sub-region one by one;

detecting a position of each first human body part in the image to be analyzed;

determining, according to the position of each first human body part in the image to be analyzed and a first transformation relation, a physical position of each first human body part in the target region, wherein the first transformation relation is a transformation relation between a physical position of the first human body part in the target region and a position thereof in the image to be analyzed; and determining the population in each sub-region according to a relative positional relation between the position of the first human body part in the image to be analyzed and the sub-image, as well as a relative positional relation between the physical position of the first human body part and the sub-region.

12. The computer device according to claim 11, wherein the first human body part comprises a head; and the program, when executed by the processor, further causes the following steps to be implemented:
acquiring a calibration image of the target region;
determining the first transformation relation according to a physical position of a preset part of a mark object in the target region and an image position of the preset part of the mark object in the calibration image; and
acquiring a physical range of the sub-region.

* * * * *